United States Patent [19]

Lynch et al.

[11] Patent Number: 5,095,458

[45] Date of Patent: Mar. 10, 1992

[54] RADIX 4 CARRY LOOKAHEAD TREE AND REDUNDANT CELL THEREFOR

[75] Inventors: Thomas W. Lynch; Steven D. McIntyre, both of Austin, Tex.

[73] Assignee: Advanced Micro Devices, Inc., Austin, Tex.

[21] Appl. No.: 503,822

[22] Filed: Apr. 2, 1990

[51] Int. Cl.[5] .................................................. G06F 7/50
[52] U.S. Cl. ............................................................ 364/787
[58] Field of Search ........................................... 364/787

[56] References Cited

U.S. PATENT DOCUMENTS

| | | | |
|---|---|---|---|
| 4,163,211 | 7/1979 | Miura | 364/787 |
| 4,660,165 | 4/1987 | Masumoto | 364/787 |
| 4,858,168 | 8/1989 | Hwang | 364/787 |
| 4,870,681 | 9/1989 | Sedlak | 364/787 |
| 4,899,305 | 2/1990 | Needles | 364/787 |
| 4,956,802 | 9/1990 | Priem | 364/787 |

OTHER PUBLICATIONS

Wade, "Binary Adder with Quaternary Lookahead" *IBM Tech. Disclosure Bulletin*, vol. 7, No. 11, Apr. 1965 pp. 1006-1008.

*Primary Examiner*—David H. Malzahn
*Attorney, Agent, or Firm*—Johnson & Gibbs

[57] ABSTRACT

A high radix carry lookahead tree includes a plurality of tree nodes, each of the tree nodes including a carrying chain or a variation thereof, and/or a NAND gate chain or a variation thereof; and each tree node may have three or more children.

5 Claims, 9 Drawing Sheets

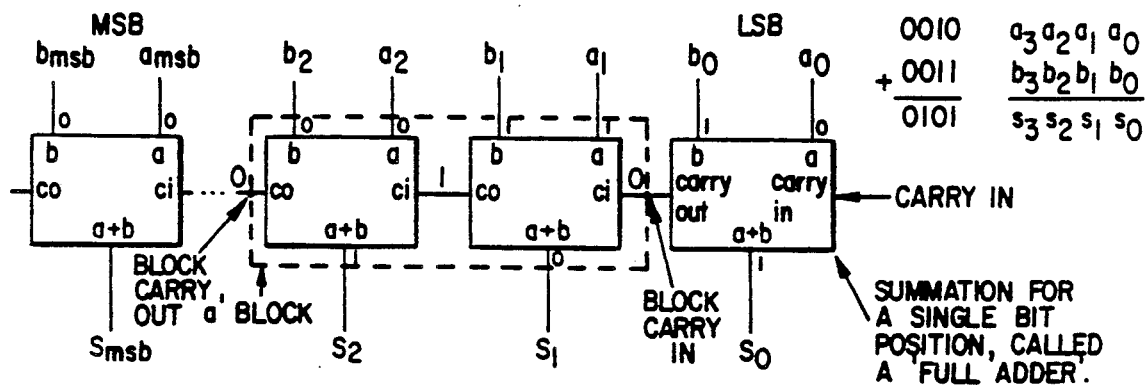
FIG. 1 (PRIOR ART) A RIPPLE CARRY ADDER AND AN EXAMPLE BLOCK. SHOWING ADDITION OF 0010+0011
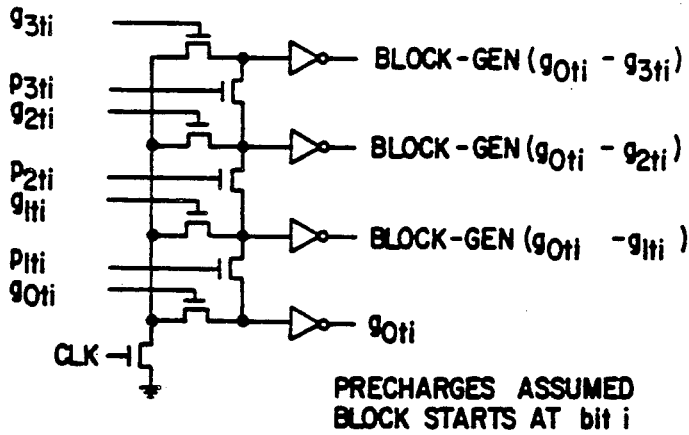
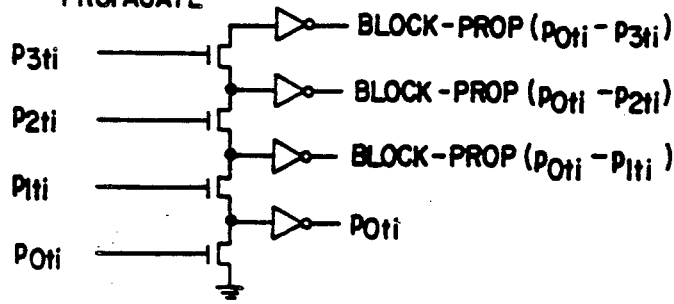
FIG. 2 (PRIOR ART) PROPAGATE AND GENERATE

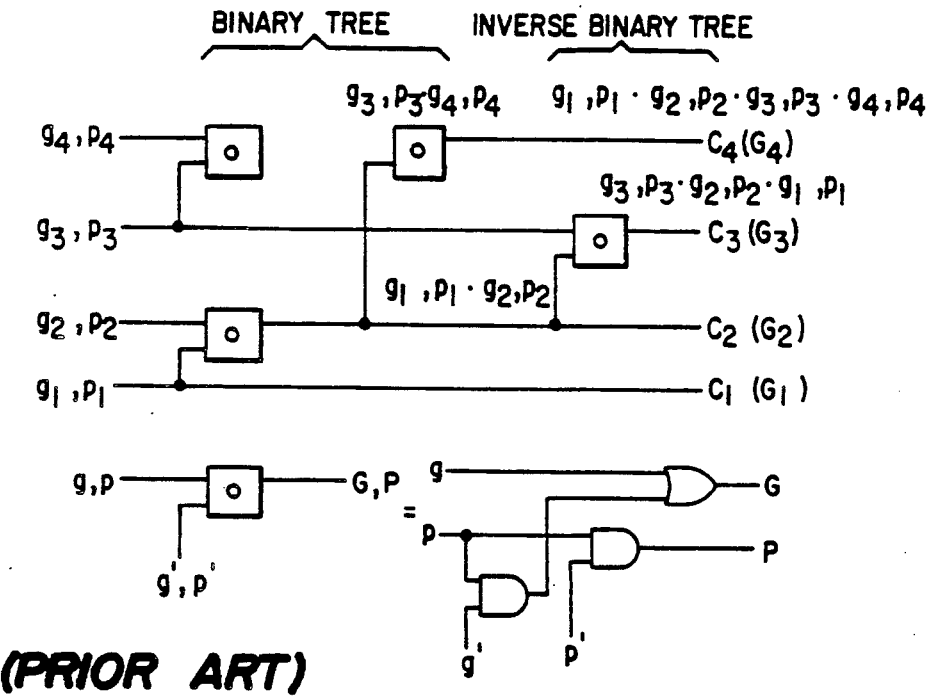
FIG. 5 (PRIOR ART)
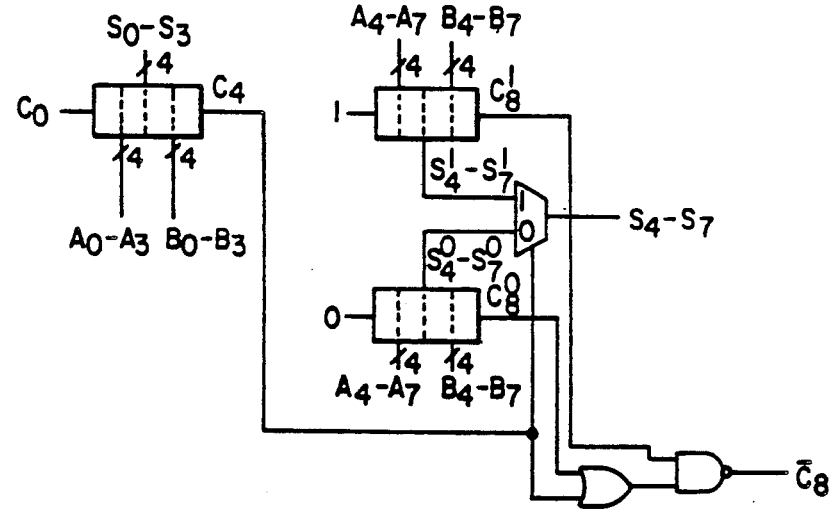
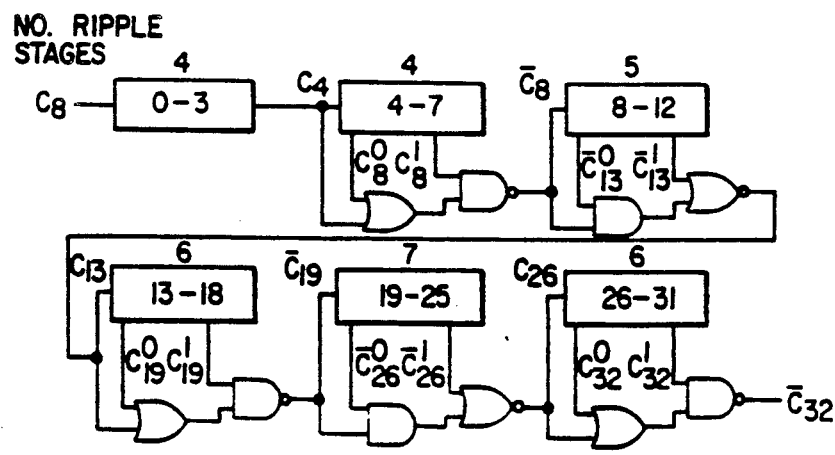
FIG. 6 (PRIOR ART)

RADIX 4 CARRY LOOKAHEAD TREE AND REDUNDANT CELL THEREFOR

CROSS REFERENCE TO RELATED APPLICATIONS

This application is related to the following U.S. Patent Applications:

| SER. NO. | TITLE | INVENTOR |
|---|---|---|
| 07/503,817 | Pipelined Floating Point Processing Unit | Perlman, et al. |
| 07/503,819 | Normalizing Pipelined Floating Point Processing Unit | Gupta, et al. |
| 07/504,127 | Arithmetic Unit Having Multiple Accumulators | Tamura, et al. |
| 07/505,351 | Apparatus and Method For Collecting Boolean Conditions of Multiple Operations | McMinn, et al. |
| 07/505,350 | A Special Carry Save Adder For High Speed Iterative Division | Shah, et al. |
| 07/503,818 | High Speed Mixed Radix Adder | Lynch, et al. |
| 07/504,324 | High Speed Divider With Square Root Option | Lynch, et al. |

All cross references are filed on even date herewith and assigned to the assignee of the present invention which are all hereby incorporated by this reference thereto.

BACKGROUND OF THE INVENTION

1. Field of the Invention

This invention relates to an improved carry lookahead technique, used, for example, in an adder.

2. Description of Related Art

In binary place value addition two operands, represented in the binary place value code, are summed to produce a result, also in binary place value code. Each operand, and the result, is an array of bits. In the binary place value code, the position of a bit in the array determines its power of two weight; hence, value=sum (bit$\times 2$ ^ pos). The bit with the least weight in determining the value of a representation is called the least significant bit, or LSB. Similarly, the bit with the greatest weight is called the most significant bit, or MSB. Other number systems have better properties for addition, but they suffer from other problems, so virtually every computer on the market today uses the binary place value code.

In the addition method done by hand, the sum is formed for the LSB position, a carry is possibly propagated to the next bit position, and the process is repeated for successive bit positions until each bit in the result has been calculated. This method is known as 'ripple carry' addition to those skilled in the art, as shown in FIG. 1. Ripple carry addition is inherently slow because of its serial nature.

Traditionally, addition has been speeded up by using one of the following techniques, as described in CMOS VLSI Design, Addison-Wesley 1985: Carry lookahead, Manchester Carry Lookahead, Binary Carry Lookahead trees, and Carry Select Addition. Another Technique, as described in the 5th Annual symposium on Theoretical Aspects of Computer Science, STACS 1988, is Condition Sum Addition. Still another techniques is the Multiple Output Domino Logic adder described in the 1988 Solid-State Circuits Conference Digest of Techniques Papers.

Each of these adders, except the Carry Select, and the Conditional Sum Adder, is based on the concepts of carry propagation, carry generation, and carry kill (see FIG. 2); which are well understood by people skilled in the art. A carry is said to 'propagate' through a bit position if a carry into the summation operation for a given bit position is followed by a carry out of the given bit position, while the summation for the given bit position does not produce a carry out when no carry is input. A carry is said to be 'generated' from a given bit position if the summation for the given position produces a carry out independent of carry in. A carry is said to be 'killed' in a bit position if a carry does not propagate through the bit. As known by people skilled in the art, and shown in FIG. 2, the propagate and generate signals may be found without actually doing the summation.

A grouping of adjacent sum functions, adjacent propagate functions, or adjacent generate functions, may be called a 'block', an example of which is shown in FIG. 1. The terms propagate, generate, and kill, may be applied to blocks. A carry is said to propagate through a given block if a carry into the given block's LSB summation is followed by a carry out of the given block's MSB summation. A block is said to generate a carry if the said block's MSB summation produce a carry out, independent of carries into the block's LSB. It is known by anyone skilled in the art that a block can only generate if a given bit position in the block generates and all bits between the given bit and the block's MSB propagate, as done in the Manchester Carry Chain described in CMOS VLSI, Addison Wesley, 1985.

An overview of carry look-ahead adder theory is given in Digital Computer Arithmetic, by J. J. F. Cavanagh, p. 107-117, McGraw-Hill (1984). The CLA speeds computation of the carries by using redundant logic. A block is defined for a given bit position such that the LSB of the block corresponds to the LSB of the add, and the MSB of the block corresponds to the given bit position. Hence, there are as many blocks as there are bit positions in the result minus 1, as shown in FIG. 3. An additional block is needed if a carry out is required. Each block has only the input operands and the carry into the add as inputs, and one carry as an output. Theoretically, any single logic function may be performed in two gate delays, so the time to produce a sum in a carry lookahead adder is theoretically a constant four gate delays; however, the finite gain of real gate limits the amount of load that any one gate can drive in a given amount of time, so more gate delays must be added. Also, since the input operands themselves are driven by gates, the number of carry blocks that can be driven, and hence the number of bits the result may have, is also limited. The carry lookahead adder becomes relatively slow for results sizes beyond a few bits. The performance of the carry lookahead adders shows that loading considerations of real gates determines add time, not the theoretical number of gate delays. A recent adder invented by Ling, presented in the IBM Journal of Research and Development, May 1981, reduces the load from the output of the propagate and generate state by one gate input per bit, per block. Although this method alleviates the loading problem, the CLA adder remains relatively inefficient for adds of more than a several bits.

The Manchester Carry Lookahead adder, FIG. 4, speeds addition by allowing carries to skip blocks that propagate. To apply this method, an add is broken into a series of blocks, such that no carry propagation logic is duplicated. Then, all of the bit propagates for a given block are ANDed together to determine if the given block will propagate. If the block will propagate, then a bypass is turned on which will route any carries into the LSB of the block directly to the output of the block's MSB. This method works well for certain size adders in CMOS; however, its performance is still linearly related to the size of the add. In attempts to alleviate this problem multiple levels of skip are added, as explained in the IEEE Transactions on Computers Volume 36. For adds greater than 32 bits, this method can only approach the speed of a Binary Lookahead Carry adder, and it will be significantly slower than the adder being presented in this application because of theoretical and practical reasons.

A binary tree is a special graph composed of nodes and arcs, similar to a family tree. The one node at the top has no predecessors, it is called the 'root' node. Each node in the tree has one or two 'children', except for the 'leaf' nodes which have no children (corresponds to the youngest generation). Circuits with special properties may be built with gates as nodes. In 1980 it was shown that an 'o' operator could be defined which would allow carries in an adder to be implemented in a binary tree [CMOS VLSI design]. However, the binary carry lookahead tree could only provide carries for bit positions of powers of 2 (i.e., 2, 4, 8 ...), so an 'inverse' tree had to be employed to derive the inbetween carries, which causes more overhead.

The Binary Lookahead Carry tree, FIG. 5 has gate delays related to the log base 2 of the add length, plus overhead. As in the case with the carry lookahead adder, circuit loading prevents the realization of the log base 2 gate delays for large trees, i.e., trees for adds bigger than about 8 bits. Also, as is known to anyone skilled in the art, the tree becomes large and inefficient to layout for large adds. The MODL gate adder, described in the 1988 IEEE Solid-State Circuits Conference Digest of Technical Papers, is an attempt to alleviate some of these problems and allows for a log base $2 \times$ linear performance (less than log base 2) for larger adds.

A Carry select adder, shown in FIG. 6, is based on the principle of partitioning the add into three blocks. The first block adds the bottom half of two operands. The second block adds the top half of the operands while assuming a carry in from the first block of zero. The third block adds the top half of the operands while assuming a carry in from the first block of one. When the carry from the first block is calculated it is used to pick the correct top half of the result by selecting the sum out of block two, or the sum out of block three via a two to one mux. When carry select adders are strung out in series they have linear performance related to the number of sections, plus the add time of the first section. For large adds, this type of adder is relatively slow, but it is small.

The Conditional Sum Adder is a recursively applied Carry Select Adder. An add is broken into many redundant blocks of two, then one set is picked so that only half as many possibly sums remain. The process of halving the possible sums is continued in multiple stages until only the result remains. This adder has a log base 2 performance; however, it is even larger than the BLC adder. Since the summation is calculated along with the carries in each stage, the summation logic is unnecessarily reproduced many times. Also, the summation overhead makes this adder slower than the BLC adder.

Because adders form the heart of many digital circuits, and they are a major contributor to the required cycle time of RISC microprocessors, there has continued to be a need for faster adders, as provided by the present invention.

SUMMARY OF THE INVENTION

The present invention provides a fast, relatively small, high radix carry lookahead tree including a plurality of nodes, each of which can have three or more child nodes. Each node contains a Manchester Carry Chain, or a variant thereof, and a NAND gate chain, or a variant thereof.

The present invention also encompasses means for extracting carries at regular boundaries from a high radix tree. More specifically, in embodiments of the present invention, the means for extracting carries may include one or more redundant nodes placed across the tree.

Accordingly, an object of the present invention is to provide a relatively small circuit for performing a relatively large add within a short period of time.

Another object of the present invention is to provide a circuit that can be easily and practically scaled, and which loses little speed when so scaled.

BRIEF DESCRIPTION OF THE DRAWINGS

Other objects, advantages and novel features of the present invention will become apparent from the following detailed description of the invention when considered in conjunction with the accompanying drawings wherein:

FIG. 1 depicts a ripple carry adder and a example block showing addition of 0010+0011;

FIG. 2 illustrates propagate and generate signals;

FIG. 5 depicts a Binary Lookahead Carry tree;

FIG. 6 depicts a Carry Selecet adder;

DETAILED DESCRIPTION OF THE INVENTION

Figure 3:
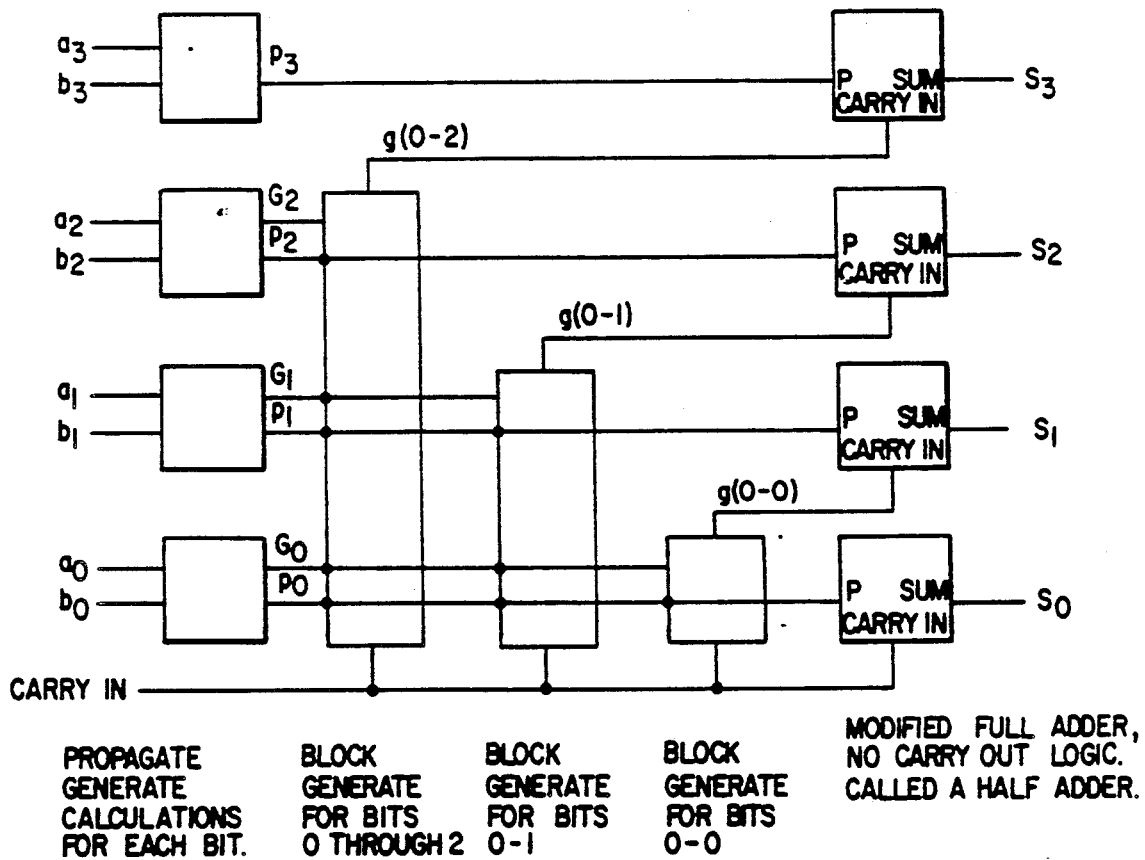
FIG. 3 depicts a prior art carry lookahead adder.
Figure 4:
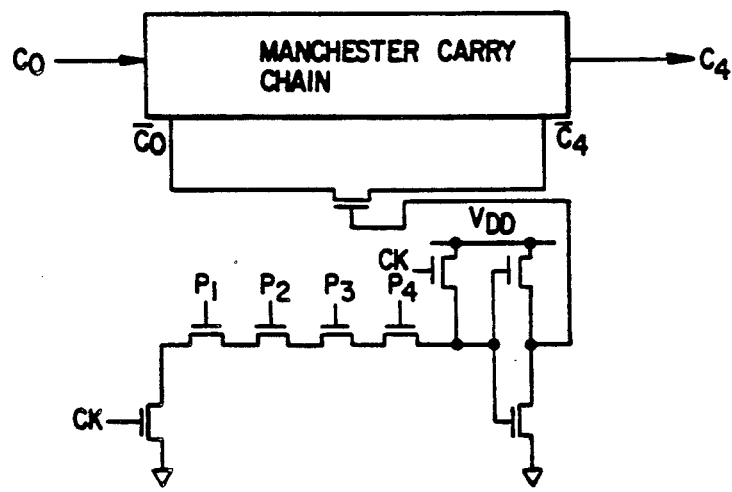
FIG. 4 depicts a Manchester Carry Lookahead adder.
Figure 7:
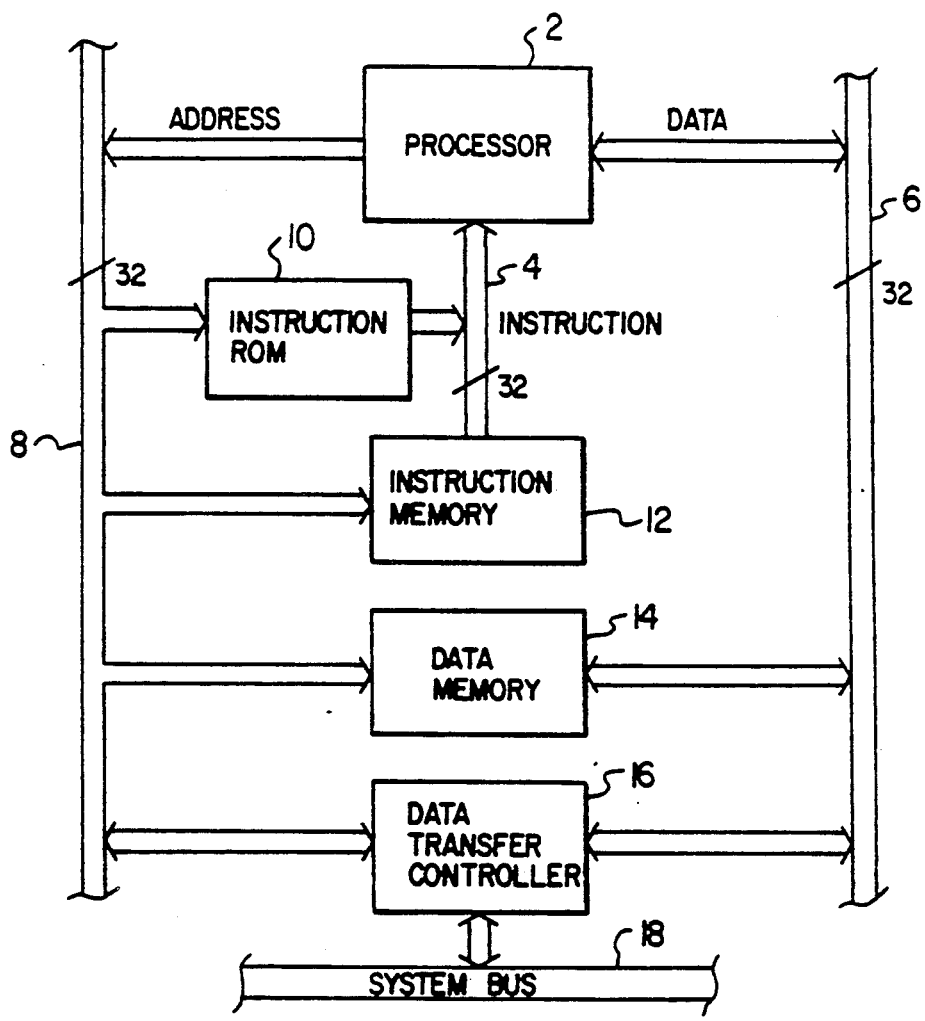
FIG. 7 is a block diagram of a system incorporating the present invention in parts thereof.

Referring now to FIG. 7, a simplified system diagram of a computing system including a processor 2 is shown therein. The purpose of this diagram, as well as several subsequent diagrams, is to illustrate an environment in which a carry lookahead tree according to the teachings of the present invention may be usefully incorporated.

Processor 2 accesses external instructions and data using three non-multiplexed buses. These buses may be referred to collectively as a channel. The channel comprises a 32-bit bus 4 for instruction transfers, a second 32-bit bus 6 for data transfers, and a third address bus 8 which is shared between instruction and data accesses. The address bus 8 is pipelined, so that it can be released before an instruction or data transfer is completed. This allows a subsequent access to begin before the first has completed, and allows the processor 2 to have two accesses in progress simultaneously.

The overall system shown in FIG. 7 may also be seen to comprise an instruction ROM 10 and instruction memory 12, both operatively connected between the address bus 8 and instruction bus 4. Additionally, a data memory 14 and data transfer controller 16 are shown to be operatively connected between the adress bus 8 and data bus 6. Further, the data transfer controller 16 is also operatively connected so as to send signals onto, and receive signals from, a system bus 18.

Figure 8:
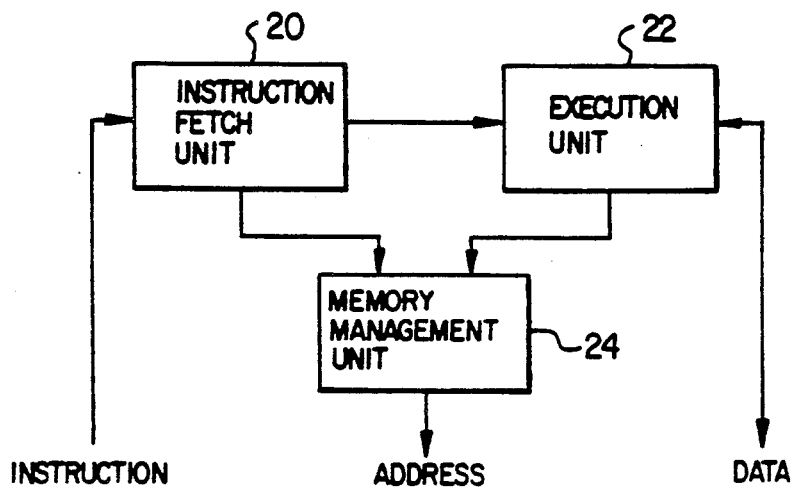
FIG. 8 is a block diagram of the processor shown in FIG. 7.

Referring now to FIG. 8, a data flow diagram of the processor 2 is shown therein so that a better understanding of that processor 2 may be obtained.

Processor 2 implements a four-stage pipeline for instruction execution, the four stages being "fetch", "decode", "execute" and "write-back". The instruction fetch unit 20 of processor 2 fetches instructions, and supplies instructions to other functional units. The unit 20 incorporates an instruction prefetch buffer, a branch target cache, and a program counter unit. These subunits will be discussed further below with reference to FIG. 9. All components of the instruction fetch unit 20 operate during the fetch stage of the processor pipeline.

Precessor 2 also includes an execution unit 22. The execution unit 22 includes a register file, an address unit, an arithmetic/logic unit, a field shift unit, a prioritizer, and a floating point processing unit. These subunits, like the subunits of the instruction fetch unit 20, are also discussed further below with reference to FIG. 9. The register file and address unit operate during the decode stage of the pipeline. The arithmetic/logic unit, field shift unit, and prioritizer operate during the execute stage of the pipeline. The register file also operates during the write-back stage.

Still further with reference to FIG. 8, the processor 2 may be seen to include a memory management unit 24. The memory management unit 24 performs address translation and memory-protection functions for all branches, loads and stores. The unit 24 operates during the execute stage of the pipeline, so the physical address that it generates is available at the beginning of the write-back stage.

Interconnection of the units 20, 22 and 24 in processor 2, as well as their interfaces with system buses, are also shown in FIG. 8.

Figure 9:
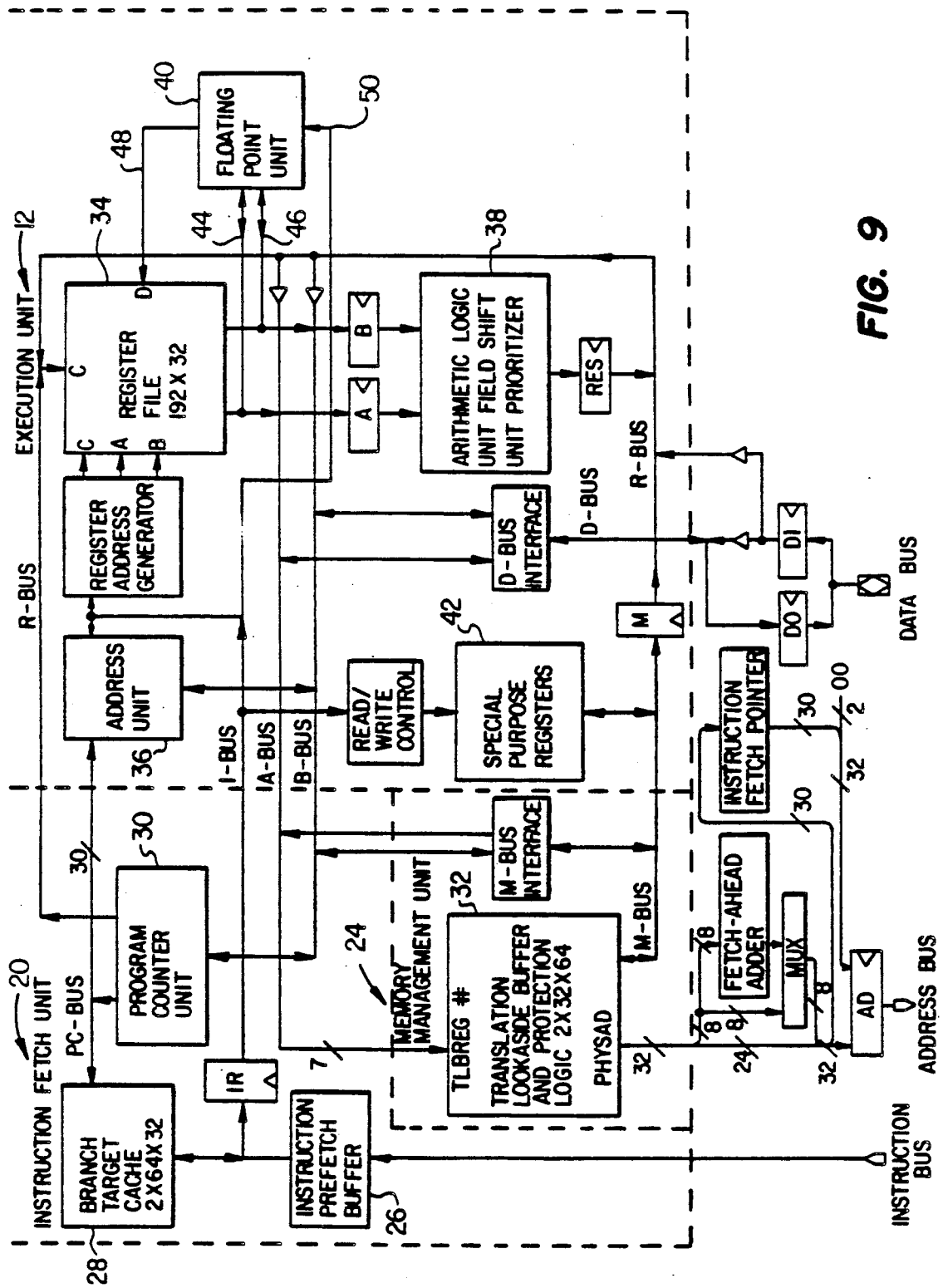
FIG. 9 is a more detailed block diagram of the processor of FIG. 8.

Referring now to FIG. 9, even further details regarding the subcomponents of the processor 2 are shown diagrammatically. As previously mentioned, the instruction fetch unit 20 may be seen to comprise an instruction prefetch buffer 26, a branch target cache 28, and a program counter unit 30. As also previously mentioned, the memory management unit 24 may be seen to comprise means 32 for performing address translation and memory protection functions for all branches, loads and stores. Finally, the execution unit 22 may be seen to comprise a register file 34, an address unit 36, an arithmetic/logic unit 38, a field shift unit (also designated by reference numeral 38), and a floating point processing unit 40. Although various other elements (e.g., special purpose registers 42) and interconnection details are shown in FIG. 9, because they are only peripherally related to the present invention, and because the diagram alone is sufficiently communicative to those skilled in the art to understand processor 2 well, further details regarding all units other than the floating point unit 40 and other elements to which it is operatively connected are not set forth herein.

Several noteworthy aspects of the floating point unit 40 may be seen with reference to FIG. 9. Recognizing that the floating point unit 40 manipulates A and B operands, those A and B operands come from the register file 34 via A and B buses 44, 46, respectively. Results of manipulations, e.g., calculations, by the floating point unit 40 are written into the register file via result bus 48. Also, instructions for operation of the floating point unit 40 are transmitted thereto via processor instruction bus 50.

Figure 10:
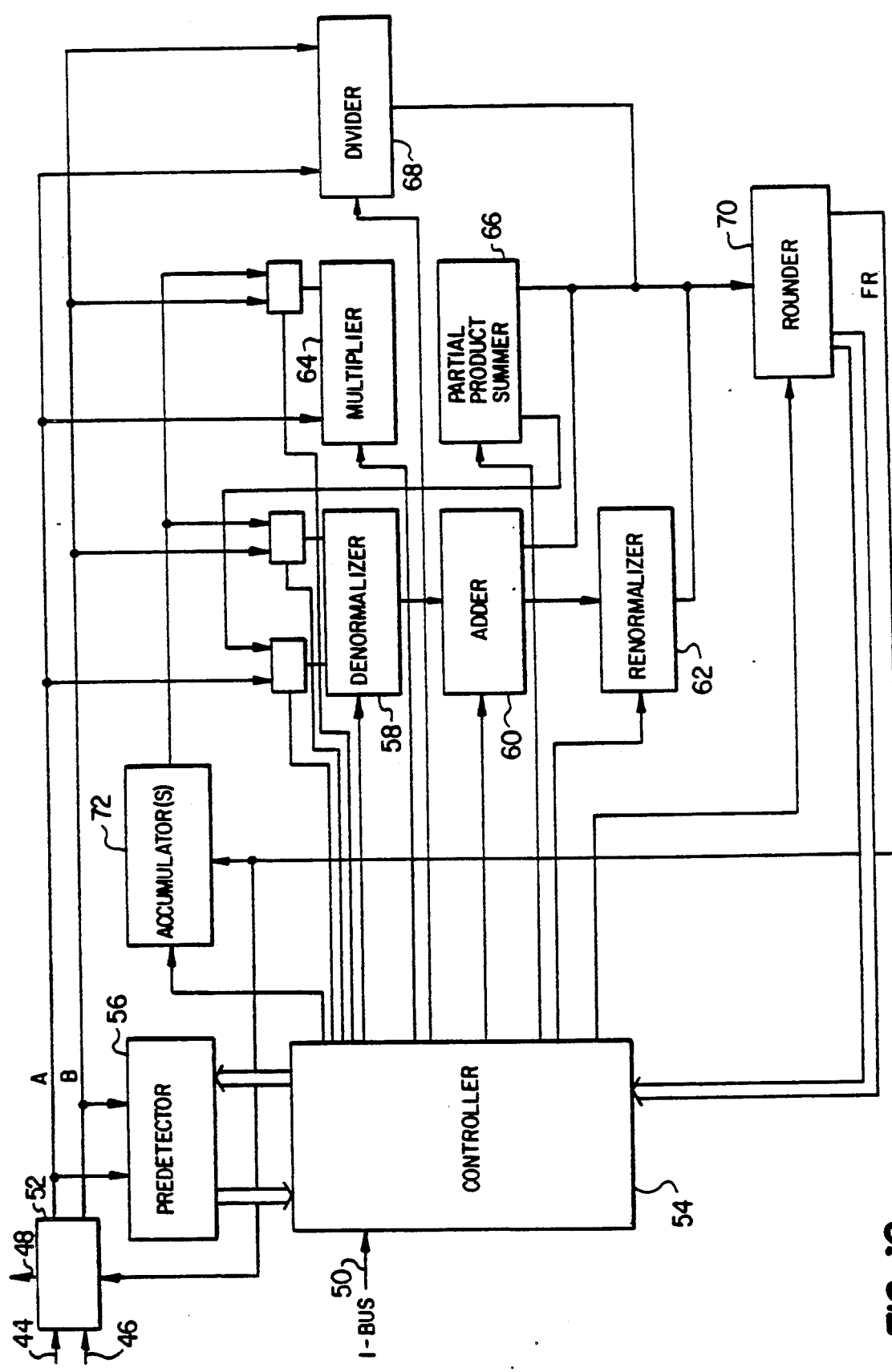
FIG. 10 is a block diagram of a floating point unit incorporating the present invention in parts thereof.

Referring now to FIG. 10, various subcomponents of a pipelined floating point processing unit constructed in accordance with the teachings of the present invention may now be seen.

THe various interface points discussed above with reference to FIG. 9 are similarly shown and labelled in this FIG, i.e., operands from the register file are fed into the floating point unit via A and B buses 44, 46, results leave the floating point unit via the result bus 48, and instructions are transmitted to the floating point unit via the instruction or I-bus 50. With special reference to FIG. 10, the A bus, B bus and result bus may be seen to be operatively connected to an interface unit 52 within the floating point unit, whereas the I-bus is operatively connected to a controller 54 therein.

It is well-known that when numbers for processing, i.e., A and B operands, are input to a floating point unit such as floating point unit 40, the floating point unit performs the desired (or instructed) arithmetic operations, and outputs the result on a result bus such as bus 48. Floating point units such as floating point unit 40 may process both floating point and integer numbers. Various floating point formats may be supported, such as 32 bit (single-precision) and 64 bit (double precision). Additionally, the floating point unit 40 may handle conversion of integers to floating point, and the reverse. Each of the above aspects of floating point unit 40 is discussed further in the related cases referred to above and incorporated herein by reference.

Referring still further to FIG. 10, those skilled in the art should appreciate the function and operation of most of the various floating point unit subcomponents shown therein. Those subcomponents which operate in a generally conventional individual manner, and are thus not discussed in detail herein, include predetector 56, denormalizer 58, multifunction unit 60, renormalizer 62, multiplier 64, partial product summer 66, divider 68, rounder 70, and accumulator(s) 72. Some very important aspects of these subcomponents and the interaction thereof exist however, and are discussed at length in the related cases, to which the reader is urged to refer.

Figure 11A:
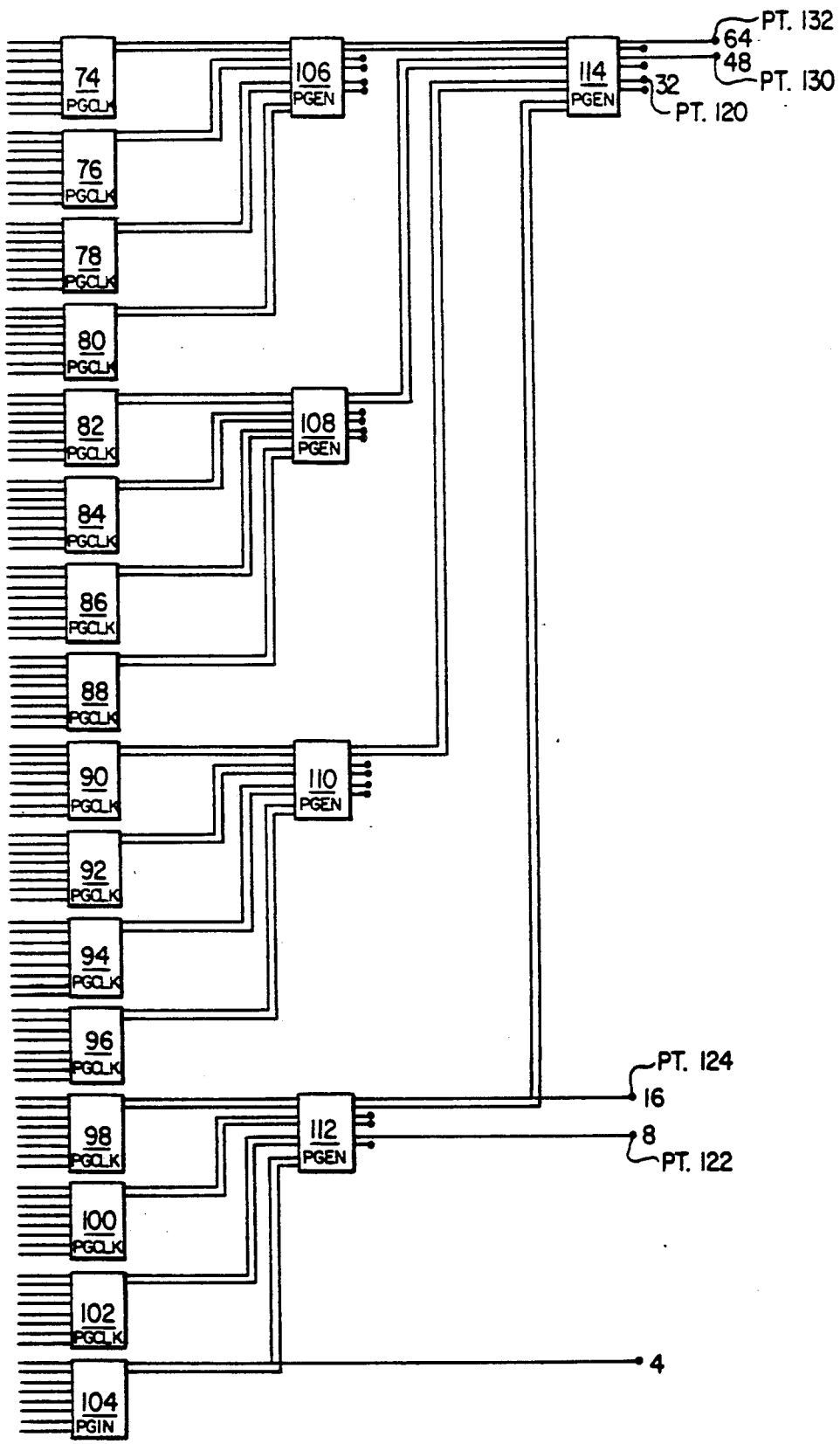
FIG. 11A is a schematic diagram of a radix-four carry lookahead tree according to the teachings of the present invention.

Referring now to FIG. 11A, a schematic diagram of a radix-four lookahead tree according to the teachings of the present invention is shown therein. This radix-four lookahead tree should be understood to be incorporateable into an adder as disclosed in related case docket number 06940/0009 further identified above, and then further incorporated into such elements as divider 68, multiplier 64 and multifunction unit 60 of the floating point unit shown in FIG. 10. Needless to say, this radix-four lookahead tree, as well as the adder referred to above, could also be used in many other places.

The tree shown in FIG. 11A may be seen to comprise three different types of blocks. These three different types of blocks are a modified carry chain block, a modified for carry in carry chain block, and a Manchester Carry Chain block. Each of these three different types of blocks are discussed further below.

Figure 11B:
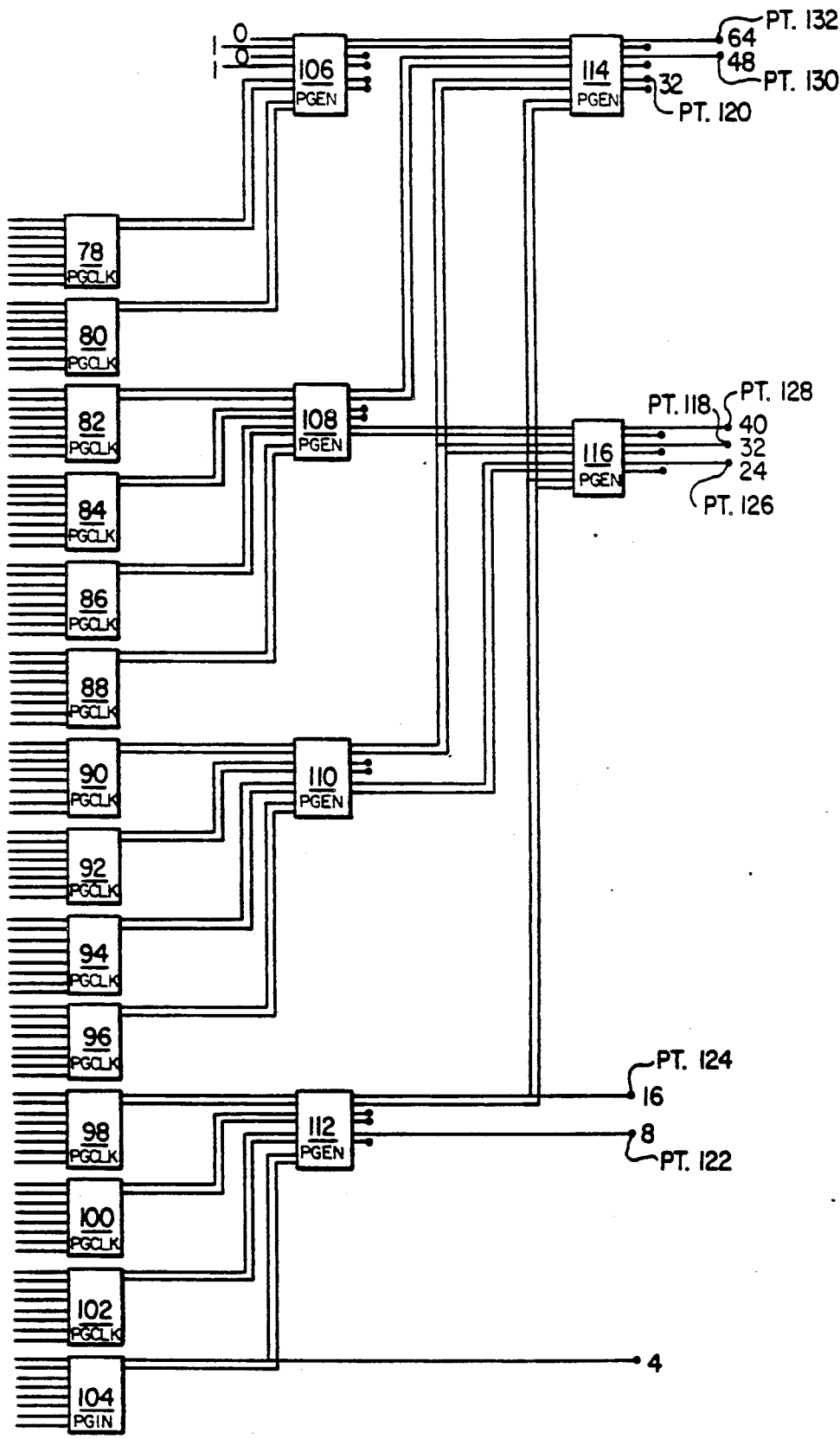
FIG. 11B is a schematic diagram of a radix-four carry lookahead tree including a redundant cell according to the teachings of the present invention.

Referring still further to FIG. 11A, and also to FIG. 11B, these three different types of blocks may be seen to be arranged in three levels. The first level comprises fifteen modified carry chain blocks 74-102 and a sixteenth block which is a modified for carry in carry chain block 104. The second level comprises four Manchester Carry Chain nodes 106-112, and the third level (specifically in FIG. 11B) comprises two Manchester Carry Chain nodes 114, 116 (one of which, designated by reference numeral 116, is effectively a "redundant cell", discussed further below) (it should be noted that the redundant cell is not shown in FIG. 11A).

Figure 12:
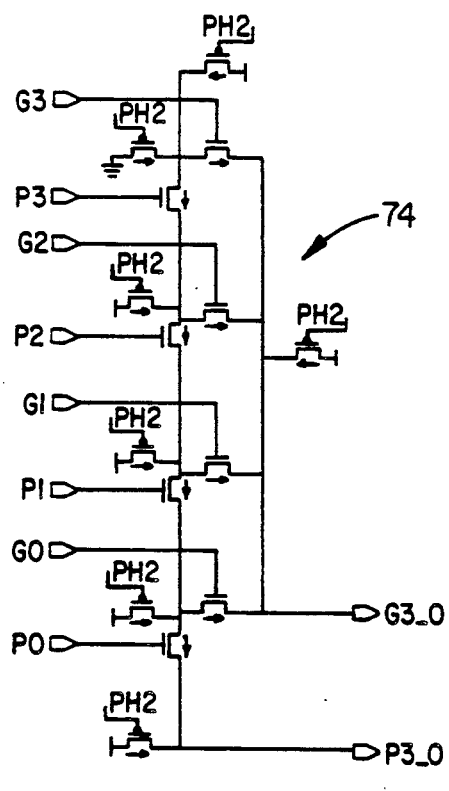
FIG. 12 is a schematic diagram of a modified carry chain according to the teachings of the present invention.
Figure 13:
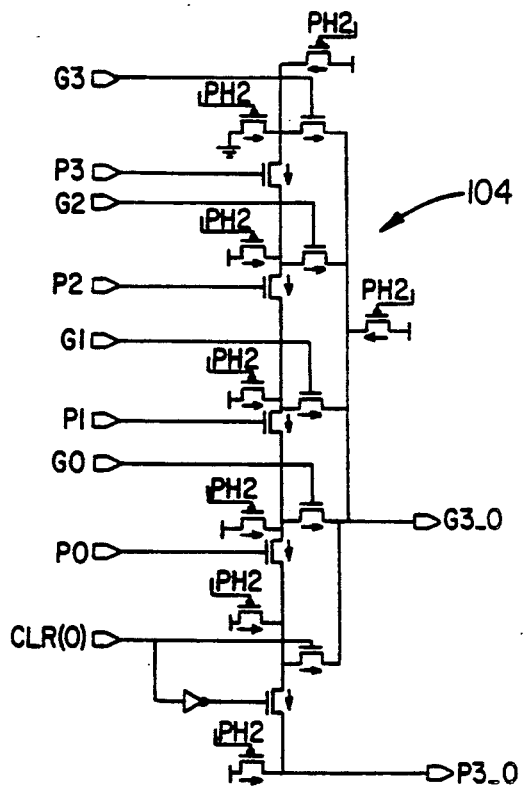
FIG. 13 is a schematic diagram of a modified for carry in cell for carry in according to the teachings of the present invention.
Figure 14:
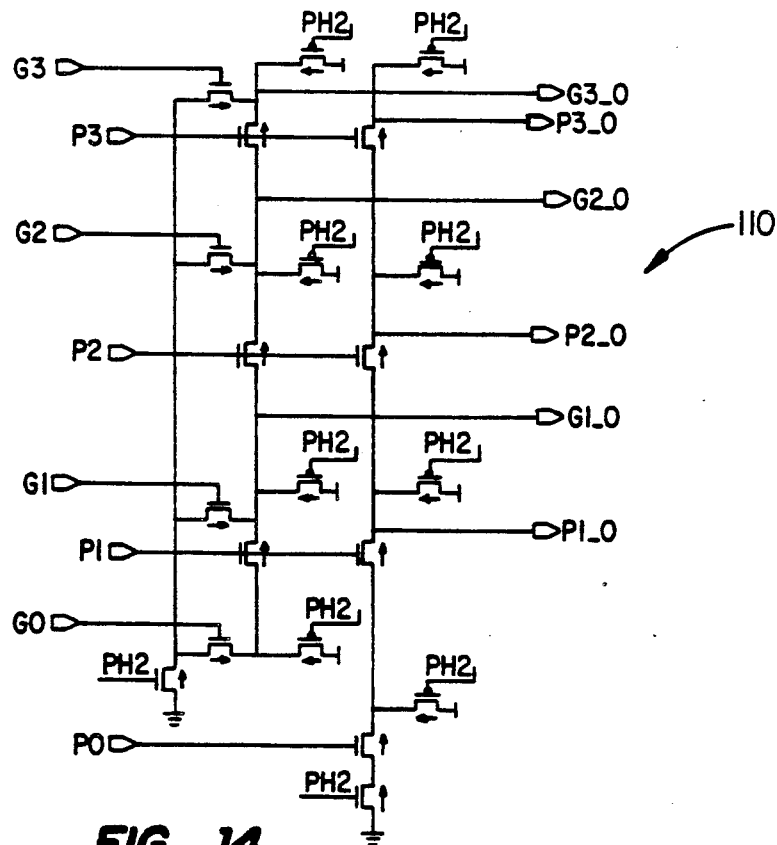
FIG. 14 is a schematic diagram of a Manchester Carry Chain block according to the teachings of the present invention.

Referring now to FIGS. 12, 13 and 14, a Manchester Carry Chain, block 110, may be seen to receive propagate and generate signals from four child nodes, or from the propagate generate inputs, and produce the block generate and block propagate signals. A modified carry chain, block 74, may be seen to do a similar function with fewer transistors. The modified carry chain, block 104, may be seen to perform a similar function while taking into account a carry in.

Referring now back to FIG. 11A, each of the nodes shown on level one: 74, 76, 78, 80, 82, 84, 86, 88, 90, 92, 94, 96, 98, 100, 102, and 104 produce block propagate and generates for four input positions. Each of the nodes on level two: 106, 108, 110, and 112; produce block propagates and generates from four of the level one blocks. Hence, level two provides information about 4×4, or 16 bit blocks. Block 114, on level three, provides block information about four of the blocks on level two, or 4×(4×4), or 64 bits. Those skilled in the art should be impressed that this circuit obtains carries in log base 4 delays, without much internal loading.

Those skilled in the art should appreciate that the circuit shown in FIG. 11B is based upon a radix-four lookahead tree. The basic radix-four lookahead tree shown in FIG. 11B gives carries at bits 0(Cin) 4, 8, 16, 32, 48 and 56. Carry 8 is available through traditional means, from block 112. Carries 24, 32, and 40 may be obtained by adding a redundant cell as discussed further below, Carries 32, 48 and 56 may be obtained from block 114. Each of the carry output points is clearly indicated in FIG. 11B. Of course, certain carries can be extracted from the tree at more than one place, e.g., CLA 32 may be extracted from both points 118 and 120. Carries on all 8 bit boundaries are available, making this an ideal carry prediction block for, but not limited to, the (06940/0009) High Speed Mixed Radix Adder, Lynch, et al., to which the reader is urged to refer.

To calculate intermediate carries, a redundant cell, e.g., block 116 may always be added. Such a cell is offset from the rest of the tree so that intermediate carry values may be completed. In FIG. 11B, block 116 is used to complete carries 24 and 40. It should be noted that the introduction of the redundant cell does not add more gate delays.

In another variation, all of the blocks on the first logic level may be deleted from the tree shown in FIGS. 11A and 11B, and the bit propagate and generates sent directly into the second level. This new configuration can produce every other carry for a 16 bit add in two gate delays. The addition of further redundant cells can be used to find all of the carries without increasing the number of gate delays.

An important aspect of the present invention relates to the Manchester Carry Chain block, e.g., block 110 shown in FIG. 14. The basic tree node is essentially, as should be appreciated now by those skilled in the art, two distinct circuits put together. The left side is the Manchester Carry Chain and the right side is a NAND gate chain.

According to the teaching of this invention, special carry lookahead trees may be made of any radix. For instance, a radix—3 tree may be constructed by limiting the number of children of a given node to no more than three. One skilled in the art can see that the same principles described in this patent may still be applied. As another example, an 8 tree may be constructed by allowing each node to have 8 children. The principles taught in this patent will still apply. A 3 tree will have log base 3 performance, while an 8 tree will have log base 8 performance. Of course, the log base 8 tree will produce a very sparse set of carries, and have very large tree nodes.

It should now also be appreciated that a circuit according to the present invention arranges fundamental carry chains in to a high radix tree.

This circuit is, in essence, an improvement over binary carry lookahead circuits. The reason the circuit is an improvement is because it incorporates a high radix technique which has better load and speed characteristics than binary carry lookahead circuits. The circuit according to the present invention has log base radix of N gate delays, where N is a size to the add, and radix is the multiplicity of the tree. Additionally, a circuit according to the present invention uses only three simple sub blocks. Also, the circuit is an iprovement because of the ease of finding intermediate carries.

Those skilled in the art should appreciate that the circuit shown in FIGS. 11A and 11B may be easily pruned for carry lookaheads of sizes other than 4 to the ith power, with i being equal to 1, 2, 3, ... . Notwithstanding such scaling being undertaken, the circuit shown in FIGS. 11A and 11B should lose little speed when scaled. For example, a 64 bit carry lookahead should require three gate delays, whereas a 256 bit carry lookahead would require merely four gate delays.

Those skilled in the art should now fully appreciate that the present invention provides an improvement over binary carry lookahead circuits. The circuit according to the teachings of the present invention solves the problem of doing a large add in a short amount of time with a relatively small electronic circuit. The circuit according to the present invention is faster and relatively smaller than the ones in the past. It has log base 4 of N gate delays where N is the size of the add, while using three simple sub blocks. Other important aspects of the present invention have been previously discussed.

Those skilled in the art will recognize that many modifications and variations besides those specifically mentioned above may be made in the construction techniques described herein without departing from the concept of the present invention. Accordingly, it should be appreciated that within the scope of the appended claims, the present invention may be practiced otherwise than as specifically described herein.

What is claimed is:

1. A carry lookahead tree-type logic circuit comprising a plurality of substantially similar subcircuits; each of said subcircuits having at least four input terminals, at least two output terminals, and an internal logic circuit; each of said subcircuits being connected in multi-stages to form a three level tree with at least fourteen subcircuits on a first level, four subcircuits on a second level, and two subcircuits on a third level; each of said subcircuits on said first level operable to produce block propagate and generate terms for four inputs on its input terminals; three of said subcircuits on said second level connected in circuit to receive the block propagate and generate terms produced by four subcircuits on said first level and to produce block propagate and generate terms therefrom; the fourth of said subcircuits on said second level connected in circuit to receive the block propagate and generate terms produced by at least two subcircuits on said first level; one of said subcircuits on said third level connected in circuit to receive the block propagate and generate terms produced by the subcircuits on said second level and to produce block propagate and generate terms therefrom; the other of said subcircuits on said third level connected in circuit to receive signals relating to carries from two of said subcircuits on said second level and to further make those signals available as output therefrom;

whereby the other of said subcircuits on said third level provides information as to intermediate carries on linear boundaries in said carry lookahead tree-type circuit.

2. In a radix 4 carry lookahead tree having a plurality of substantially similar subcircuits, each of said subcircuits having at least four input terminals, at least two output terminals, and an internal logic circuit; each of said subcircuits being connected in multi-stages to form a three level tree with at least fourteen subcircuits on a first level, four subcircuits on a second level, and two subcircuits on a third level; wherein each level of the tree collects four carries so that carry information from only two of the four level two subcircuits is available at level three; means for collecting carry information from said other two level two subcircuits comprising:

a subcircuit having at least four input terminals, at least two output terminals, and an internal logic circuit, said subcircuit operable to extract and relay carry information from level two subcircuits that provide such information; and means for connecting said subcircuit in circuit so as to receive carry information from said other two level two subcircuits whereby said subcircuit uses overlapping information from said second level subcircuits to provide information regarding carries on linear boundaries of said radix 4 carry lookahead tree.

3. A means for collecting as recited in claim 2, wherein said internal logic circuit comprises a carry logic portion.

4. A means for collecting as recited in class 3, wherein said internal logic circuit further comprises a NAND gate portion.

5. A means for collecting as recited in claim 4, wherein said subcircuits produce propagate and generate signals, and further comprising means for connecting said subcircuit in circuit so as two receive propagate and generate signals from two of said level two subcircuits, only one of which it also receives carry information from.

* * * * *

UNITED STATES PATENT AND TRADEMARK OFFICE
CERTIFICATE OF CORRECTION

PATENT NO. : 5,095,458  Page 1 of 2

DATED : March 10, 1992

INVENTOR(S) : Thomas W. Lynch; Steven D. McIntyre

It is certified that error appears in the above-identified patent and that said Letters Patent is hereby corrected as shown below:

Column 2 Line 2
delete "Techniques"
insert --Technical--

Column 2 Line 28
delete "produce"
insert --produces--

Column 2 Line 51
delete "gate"
insert --gates--

Column 5 Line 27
delete "adress"
insert --address--

Column 6 Line 10
insert after 38), --a prioritizer (also designated by reference numeral 38),--

UNITED STATES PATENT AND TRADEMARK OFFICE
CERTIFICATE OF CORRECTION

PATENT NO. : 5,095,458

DATED : March 10, 1992

INVENTOR(S) : Thomas W. Lynch; Steven D. McIntyre

It is certified that error appears in the above-indentified patent and that said Letters Patent is hereby corrected as shown below:

Column 6, line 34
delete "THe"
insert --The--.

Signed and Sealed this

Eighth Day of June, 1993

Attest:

MICHAEL K. KIRK

Attesting Officer     *Acting Commissioner of Patents and Trademarks*